United States Patent
Liu et al.

(10) Patent No.: US 9,773,149 B2
(45) Date of Patent: Sep. 26, 2017

(54) FINGERPRINT IDENTIFICATION MODULE, DRIVE CONTROL CIRCUIT, DISPLAY SUBSTRATE AND DISPLAY DEVICE

(71) Applicants: Boe Technology Group Co., Ltd., Beijing (CN); Beijing Boe Optoelectronics Technology Co., Ltd., Beijing (CN)

(72) Inventors: Wei Liu, Beijing (CN); Xue Dong, Beijing (CN); Hailin Xue, Beijing (CN); Haisheng Wang, Beijing (CN); Xiaochuan Chen, Beijing (CN); Xiaoliang Ding, Beijing (CN); Shengji Yang, Beijing (CN); Yingming Liu, Beijing (CN); Weijie Zhao, Beijing (CN); Hongjuan Liu, Beijing (CN); Changfeng Li, Beijing (CN); Lei Wang, Beijing (CN); Pengpeng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/037,411

(22) PCT Filed: Jan. 28, 2016

(86) PCT No.: PCT/CN2016/072509
§ 371 (c)(1),
(2) Date: May 18, 2016

(87) PCT Pub. No.: WO2017/020565
PCT Pub. Date: Feb. 9, 2017

(65) Prior Publication Data
US 2017/0161538 A1    Jun. 8, 2017

(30) Foreign Application Priority Data

Jul. 31, 2015  (CN) .......................... 2015 1 0463479

(51) Int. Cl.
*G06K 9/00*          (2006.01)
(52) U.S. Cl.
CPC ......... *G06K 9/0002* (2013.01); *G06K 9/0008* (2013.01)
(58) Field of Classification Search
CPC .......................... G06K 9/0002; G06K 9/0008
(Continued)

(56) References Cited

U.S. PATENT DOCUMENTS

| 6,448,790 B1 | 9/2002 | Imai | |
| 2014/0218339 A1* | 8/2014 | Hotelling | G06F 3/044 345/174 |
| 2016/0364595 A1* | 12/2016 | Du | G06K 9/0002 |

FOREIGN PATENT DOCUMENTS

| CN | 101452527 | 6/2009 |
| CN | 103810479 | 5/2014 |

(Continued)

OTHER PUBLICATIONS

International Search Report and Written Opinion from PCT/CN16/072509 dated Mar. 29, 2016.

*Primary Examiner* — Ruiping Li
(74) *Attorney, Agent, or Firm* — Calfee, Halter & Griswold LLP

(57) ABSTRACT

The present disclosure relates to a fingerprint identification module, including: a plurality of sensing units, wherein each sensing unit receives modulation signal when turned on, the modulation signal covers at least one first time interval and at least one second time interval, and the voltages during the first and second time intervals are respectively first and second voltages; a collecting unit for collecting output
(Continued)

signals of the sensing units in the same column in all the first time intervals as a first signal and those in all the second time intervals as a second signal; and a calculating unit for determining the difference between the first and second signals to obtain a third signal and obtaining the fingerprint information sensed on the basis of the third signal. Through the above solution, it is possible to eliminate the influence of the leakage current in the sensing unit, thereby accurately identifying fingerprints.

20 Claims, 4 Drawing Sheets

(58) Field of Classification Search
USPC .......................................................... 382/125
See application file for complete search history.

(56) References Cited

FOREIGN PATENT DOCUMENTS

| | | |
|---|---|---|
| CN | 104252621 | 12/2014 |
| CN | 104778923 | 7/2015 |
| CN | 105095874 | 11/2015 |
| WO | 2010/058631 | 5/2010 |

* cited by examiner

US 9,773,149 B2

FINGERPRINT IDENTIFICATION MODULE, DRIVE CONTROL CIRCUIT, DISPLAY SUBSTRATE AND DISPLAY DEVICE

RELATED APPLICATIONS

The present application is the U.S. national phase entry of PCT/CN2016/072509, with an international filing date of Jan. 28, 2016, which claims the benefit of Chinese Patent Application No. 201510463479.7, filed on Jul. 31, 2015, the entire disclosures of which are incorporated herein by reference.

TECHNICAL FIELD

The present disclosure relates to the field of display technology, and more particularly to a fingerprint identification module, a drive control circuit, a display substrate, a display device, and a fingerprint identification method.

BACKGROUND ART

In recent years, with the rapid development of technologies, mobile products having a biological identification function have gradually entered people's life and work. Great importance is attached to a fingerprint technology by right of its unique identity characteristic.

Push-type and sliding-type fingerprint identification technologies on the basis of silicone-based process have been integrated into mobile products. In the future, people will likely focus their attention on a fingerprint identification technology in a display area. When a fingerprint device based on an image sensor is scanning fingerprints, the light that a light source irradiated onto fingers will result in different reflections due to the difference between ridges and valleys of a fingerprint, thereby leading to variation of intensity of light arriving at a photosensitive device and generating dissimilar photocurrent differences. Under the control of a control device, the current differences of the sensing devices are read out in sequences in order to achieve the detection of ridges and valleys of the fingerprint.

Since the sensing device itself has leakage current, it greatly affects the detection of ridges and valleys of the fingerprint and the extraction of feature information. Under the influence of the difference of processes and the consistency of devices, different sensors have extremely different leakage currents, which can hardly be calculated in a uniform way.

SUMMARY

It is desirable in the art to solve the technical problem of how to eliminate influence of leakage current in a sensing unit.

To this end, according to one aspect, there is provided a fingerprint identification module, comprising:

a plurality of sensing units, wherein each sensing unit receives modulation signals when it is turned on, the modulation signal comprising at least one first time interval and at least one second time interval, and wherein the voltage of the modulation signal during the first time interval is a first voltage and that during the second time interval is a second voltage;

a collecting unit for collecting output signals of the sensing units in the same column in all the first time intervals as a first signal and collecting output signals of the sensing units in the same column in all the second time intervals as a second signal; and a calculating unit for determining the difference between the first signal and the second signal as a third signal and obtaining the fingerprint information sensed by the turned-on sensing unit on the basis of the third signal.

Optionally, the sensing unit comprises a sensing element and a control element, wherein the control element is connected to the sensing element and the collecting unit and is used for controlling turn-on of the sensing element.

Optionally, the sensing element comprises a sensing transistor, the control element comprises a control transistor, and the sensing transistor is connected to the control transistor, wherein when a scanning line connected to the control transistor transmits high voltage, the control transistor is turned on and the sensing transistor receives the modulation signal.

Optionally, gates of the control transistors in the same row are connected to one scanning line.

Optionally, the collecting unit comprises a collecting line connected to drains of the control transistors in the same column.

Optionally, the voltage difference between the drain and the source of the sensing transistor is greater than a first preset value, such that the sensing transistor is at a saturation area, and the gate of the sensing transistor receives the modulation signal.

Optionally, the first voltage is greater than the turn-on voltage of the sensing transistor, and the second voltage is less than the turn-on voltage of the sensing transistor.

Optionally, the first voltage is greater than the second voltage, and the second voltage is greater than the turn-on voltage of the sensing transistor.

Optionally, the fingerprint identification module further comprises: a plurality of switching units, each switching unit when turned on receiving the modulation signal and transmitting the modulation signal to the gates and the drains of the sensing transistors in the corresponding row.

Optionally, the switching unit comprises a switching transistor, the gate of the switching transistor and the gates of the control transistors in the corresponding row are connected to the same scanning line, the drain of the switching transistor is connected with the gates and the drains of the sensing transistors in the corresponding row, and the source of the switching transistor receives the modulation signal, wherein the sources of a plurality of switching transistors are connected to each other.

Optionally, the voltage difference of the gates of the sensing transistor is greater than the turn-on voltage of the sensing transistor and less than a second preset value, such that the sensing transistor is at a variable resistance area and the drain of the sensing transistor receives the modulation signal.

Optionally, the sensing element comprises a photoelectric diode.

According to another aspect of the present disclosure, there is also provided a drive control circuit used for the above-mentioned fingerprint identification module, which is used to generate the aforementioned modulation signal and transmit the modulation signal to the sensing units.

According to another aspect of the present disclosure, there is also provided a display substrate comprising the aforementioned fingerprint identification module and/or the aforementioned drive control circuit.

According to another aspect of the present disclosure, there is also provided a display device comprising the aforementioned display substrate.

According to another aspect of the present disclosure, there is also provided a fingerprint identification method, comprising the steps of:

receiving a modulation signal by a turned-on sensing unit, the modulation signal comprising at least one first time interval and at least one second time interval, the voltage of the modulation signal during the first time interval being a first voltage and that during the second time interval being a second voltage;

collecting output signals of the sensing units in the same column in all the first time intervals as a first signal, and collecting output signals of the sensing units in the same column in all the second time intervals as a second signal; and determining the difference between the first signal and the second signal to obtain a third signal, and obtaining fingerprint information sensed by the turned-on sensing unit on the basis of the third signal.

Optionally, the sensing transistor in the sensing unit receives the modulation signal.

Optionally, when the voltage difference between the drain and the source of the sensing transistor is greater than a first preset value and the sensing transistor is at a saturation area, the gate of the sensing transistor receives the modulation signal.

Optionally, the switching unit receives the modulation signal and transmits the modulation signal to the gates and the drains of the sensing transistors in the corresponding row.

Optionally, when the voltage difference of the gate of the sensing transistor is greater than the turn-on voltage of the sensing transistor and less than a second preset value and the sensing transistor is at a variable resistance area, the drain of the sensing transistor receives the modulation signal.

The above technical solutions eliminate the influence of the leakage current in the sensing unit during the fingerprint scanning phase, so as to make the current signals on which the calculation of fingerprint information is based correspond to the sensed difference between ridges and valleys of the fingerprint, thereby accurately identifying fingerprints.

BRIEF DESCRIPTION OF DRAWINGS

Reference can be made to drawings so as to understand the features and advantages of some embodiments of the present disclosure more clearly. The drawings are for illustration only and shall not be understood as making any limitation to the present invention.

DETAILED DESCRIPTION

To assist those skilled in the art in better understanding the aforementioned object, features and advantages, some embodiments will be further described in detail with reference to drawings and the specific implementations. It shall be explained that the embodiments and the features therein of the present application can be combined as long as they are not in conflict with each other.

Many specific details are presented in the following depiction for sufficient understanding of the present invention. However, the present invention can be also carried out by other manners different from those recited herein. Thus, the protection scope of the present invention is not limited by the following embodiments.

Figure 1:
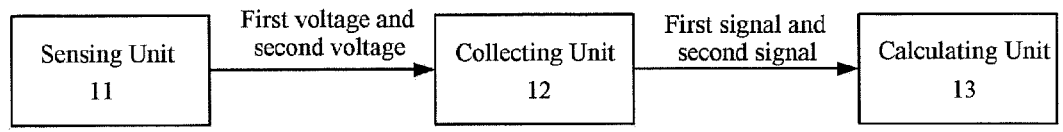
FIG. 1 is a schematic view illustrating signal transmission of a fingerprint identification module according to an embodiment of the present invention.

As shown in FIG. 1, a fingerprint identification module according to an embodiment of the present disclosure comprises a plurality of sensing units 11, a collecting unit 12 and a calculating unit 13. Among the plurality of sensing units 11 in the same column, there is only one sensing unit 11 that is turned on at one time. The sensing unit 11 when turned on receives a modulation signal that comprises at least one first time interval and at least one second time interval. The voltage of the modulation signal during the first time interval is the first voltage, and the voltage thereof during the second time interval is the second voltage. The collecting unit 12 is used to collect the output signals of the sensing units in the same column in all the first time intervals as the first signal, and collect the output signals of the sensing units in the same column in all the second time intervals as the second signal. The calculating unit 13 is used to determine the difference between the first signal and the second signal to obtain a third signal, and obtain the fingerprint information sensed by the turned-on sensing unit on the basis of the third signal.

Figure 2:
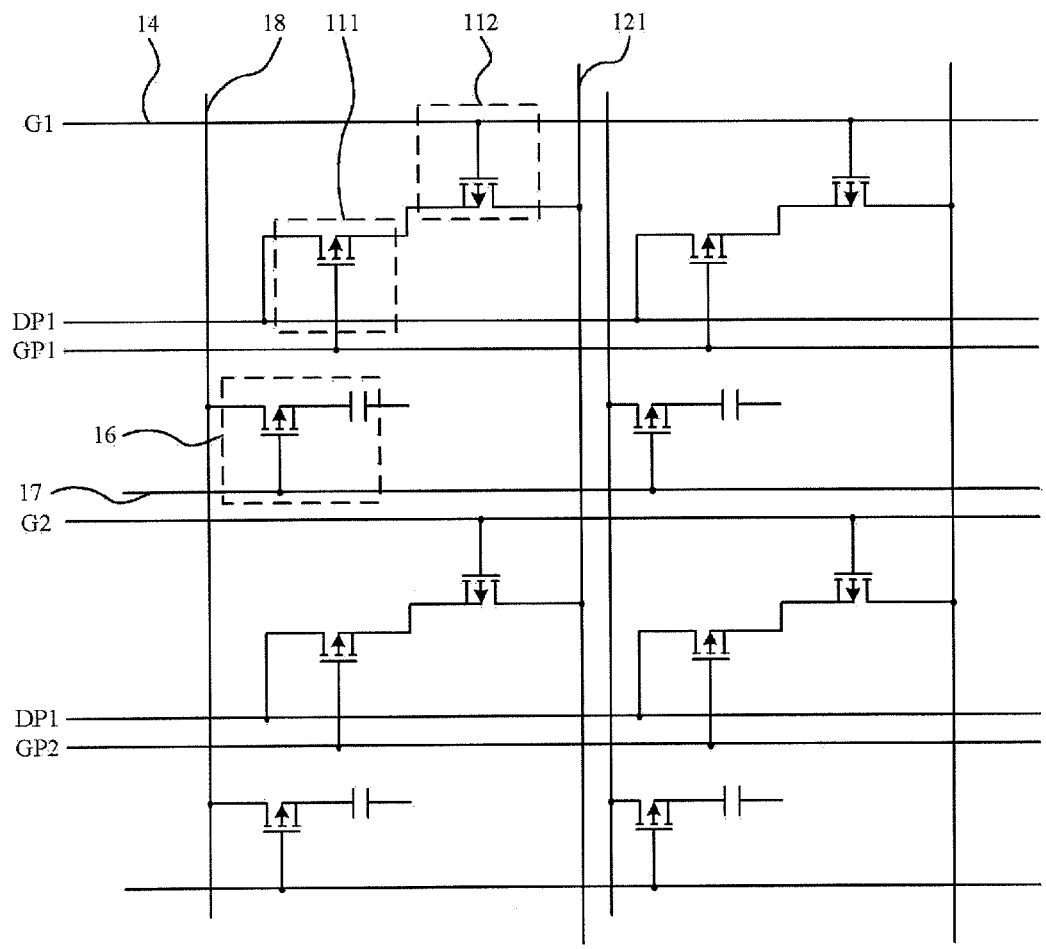
FIG. 2 is a structural schematic view of the fingerprint identification module according to an embodiment of the present invention.

As shown in FIG. 2, during the fingerprint scanning phase, each scanning line 14 may transmit high voltage to the sensing unit 11 (which may include a sensing transistor 111 and a control transistor 112) in a corresponding row so as to turn on the sensing unit 11 in that row, such that a collecting line 121 in the collecting unit 12 can receive the current generated by the difference between ridges and valleys of the fingerprint sensed by the corresponding sensing transistor 111 through the control transistor 112, wherein the scanning lines 14 may be turned on one by one, and the turned-on scanning line transmits voltage to the sensing unit 11 in the corresponding row, such that only one sensing unit 11 among a plurality of sensing units 11 in the same column is turned on. Of course, a plurality of scanning lines may be arranged as a set according to demands, and each set of the scanning lines 14 is turned on sequentially.

Figure 3:
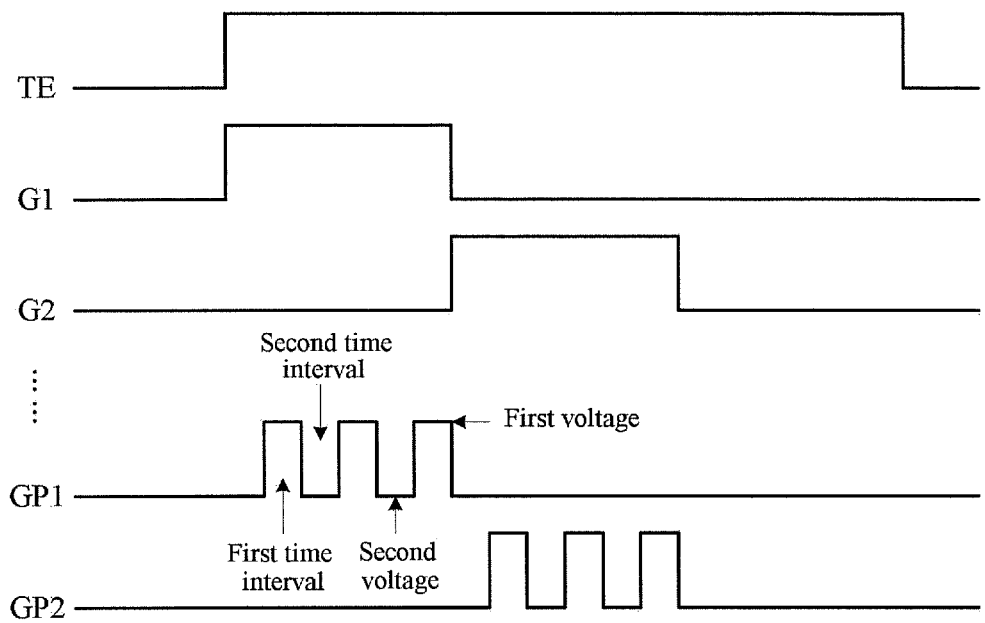
FIG. 3 is a schematic view of a modulation signal according to an embodiment of the present invention.

As shown in FIG. 3, during the fingerprint scanning phase, a signal TE is at a high level. The high voltages transmitted by the adjacent scanning lines 14, e.g. the scanning line G1 and the scanning line G2, are different from each other by a row scanning period, and the sensing units 11 are turned on row by row under the control of the scanning lines 14. In the control transistors 112 and the sensing transistors 111 of the sensing units 11 that are not turned on, there is leakage current between the source and the drain. The modulation signals received by the sensing units 11 in adjacent rows are also different from each other by a row scanning period. The modulation signal can be superimposed to the turn-on voltage of the sensing transistors 111. When the sensing transistor 111 receives the modulation signal, the signal line DP1 provides high voltage to the drain of the sensing transistor.

The collecting line 121 can, on the one hand, collect the current generated by the sensing transistor 111 corresponding to the turned-on control transistor, and, on the other hand, collect the leakage current of the turned-off control transistor 112 in the same column and the corresponding sensing transistor 111. For instance, as shown in FIG. 3, when the control transistor 112 corresponding to the scanning line G1 is turned on, the sensing transistor 111 receives the modulation signal GP1, the first voltage of the modulation signal GP1 is a high voltage, and the second voltage thereof is 0. In other words, the sensing transistor 111 is turned on at the first time interval and turned off at the second time interval.

For instance, the fingerprint identification module comprises a M-by-N sensing units 11, the first signal collected by one scanning line 121 is $mI+i_1+i_2+ \ldots +i_M$, and the second signal collected by the scanning line 121 is $i_1+i_2+ \ldots +i_M$, wherein m is the number of the first time intervals, M is the number of the scanning lines, $i_1$ to $i_M$ are the leakage currents of the sensing transistors 111 and the control transistors 112 of the first row to the Mth row in that column of the sensing unit, I is the current of the turned-on sensing transistors 111 and control transistors 112 in that column of the sensing unit 11, which comprises the current corresponding to the first voltage and the sensing current generated by the sensing transistors 111 when sensing the ridges and valleys of the fingerprint.

Finally, the calculating unit 13 (e.g., a processor) can calculate the difference between the first signal and the second signal to obtain that the third signal is mI, which has no leakage current therein, such that it is possible to obtain fingerprint information more accurately on the basis of the third signal and thereby improve accuracy of fingerprint identification.

What needs to be explained is that the transistor 16 in FIG. 2 is a film transistor for driving a pixel, and a gate line 17 and a data line 18 transmits a gate signal and a data signal to the pixel respectively.

Optionally, the sensing unit 11 comprises a sensing element and a control element that is connected to the sensing element and the collecting unit 12 in order for controlling the turn-on of the sensing element.

As shown in FIG. 2, optionally, the sensing element comprises a sensing transistor 111, the control element comprises a control transistor 112, and the sensing transistor 111 is connected to the control transistor 112, e.g., the source of the sensing transistor is connected to the source of the control transistor 112.

For instance, during the fingerprint scanning phase, a signal TE in FIG. 2 is a high voltage. When the scanning line 14 transmits the high voltage, the control transistor 12 is turned on and the sensing transistor 111 receives the modulation signal.

Optionally, gates of the control transistors 112 in the same row are connected to one scanning line 14.

Optionally, the collecting unit 12 comprises a collecting line 121 connected to drains of the control transistors 122 in the same column. The collecting unit 12 may further comprise a noise removing module that can remove noise signals different from the first signal and the second signal in terms of frequency.

Optionally, the voltage difference between the drain and the source of the sensing transistor 111 is greater than a first preset value, such that the sensing transistor 111 is at a saturation area, and the gate of the sensing transistor 111 receives the modulation signal.

When the sensing transistor 111 is at the saturation area, the output current of the sensing transistor 111 is not influenced by the voltage across the source and drain, but is merely subject to the control of the voltage across the gate and the source. Under these circumstances, the output current relating to the first voltage can be obtained when the first voltage is input to the gate of the sensing transistor 111, and the output current relating to the second voltage can be obtained when the second voltage is input to the gate of the sensing transistor 111.

As shown in FIG. 3, optionally, the first voltage of the modulation signal is greater than the turn-on voltage of the sensing transistor, and the second voltage is less than the turn-on voltage of the sensing transistor, such as 0.

According to the modulation signal set in the present embodiment, the sensing transistor 111 is turned on during the first time interval and turned off during the second time interval. Thus, no matter if the number of the first time intervals is equal to that of the second time intervals, the second signal is always equal to $i_1+i_2+ \ldots +i_M$, and the result of determining the difference (namely, the third signal) between the first signal and the second signal is just equal to the current of the modulation signal in the first signal (for instance, if the number of the first time intervals is x, then the current is equal to x times of the current corresponding to the first voltage) so as to facilitate subsequent calculation.

Figure 4:
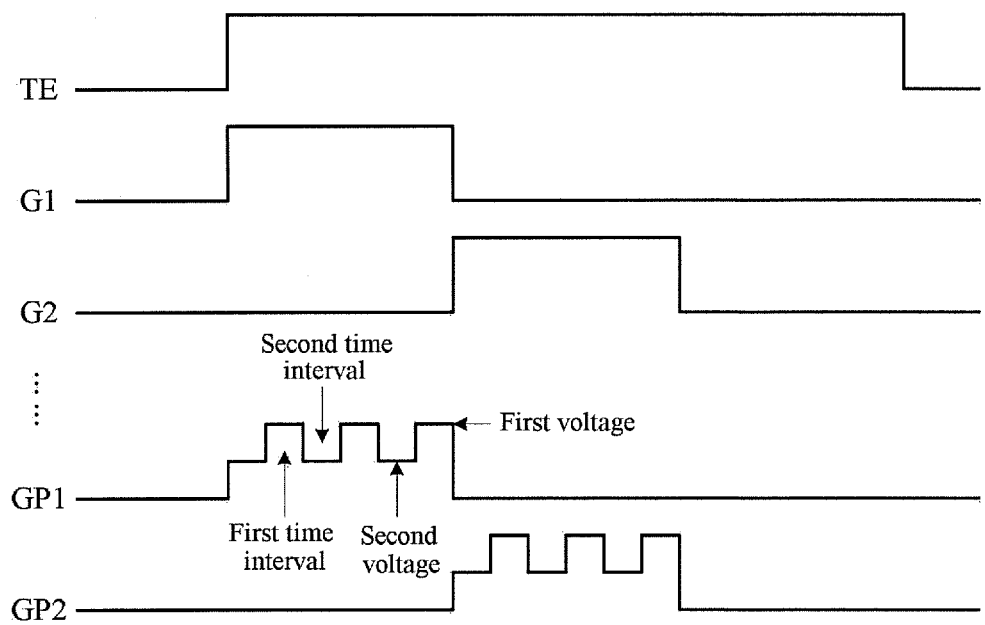
FIG. 4 is a schematic view of a modulation signal according to a further embodiment of the present invention.

As shown in FIG. 4, optionally, the first voltage is greater than the second voltage, and the second voltage is greater than the turn-on voltage of the sensing transistor.

According to the modulation signal set in the present embodiment, it can ensure that the sensing transistor 111 is always in a turned-on state during the fingerprint scanning phase to continuously collect fingerprint information, thereby obtaining full fingerprint information.

Figure 5:
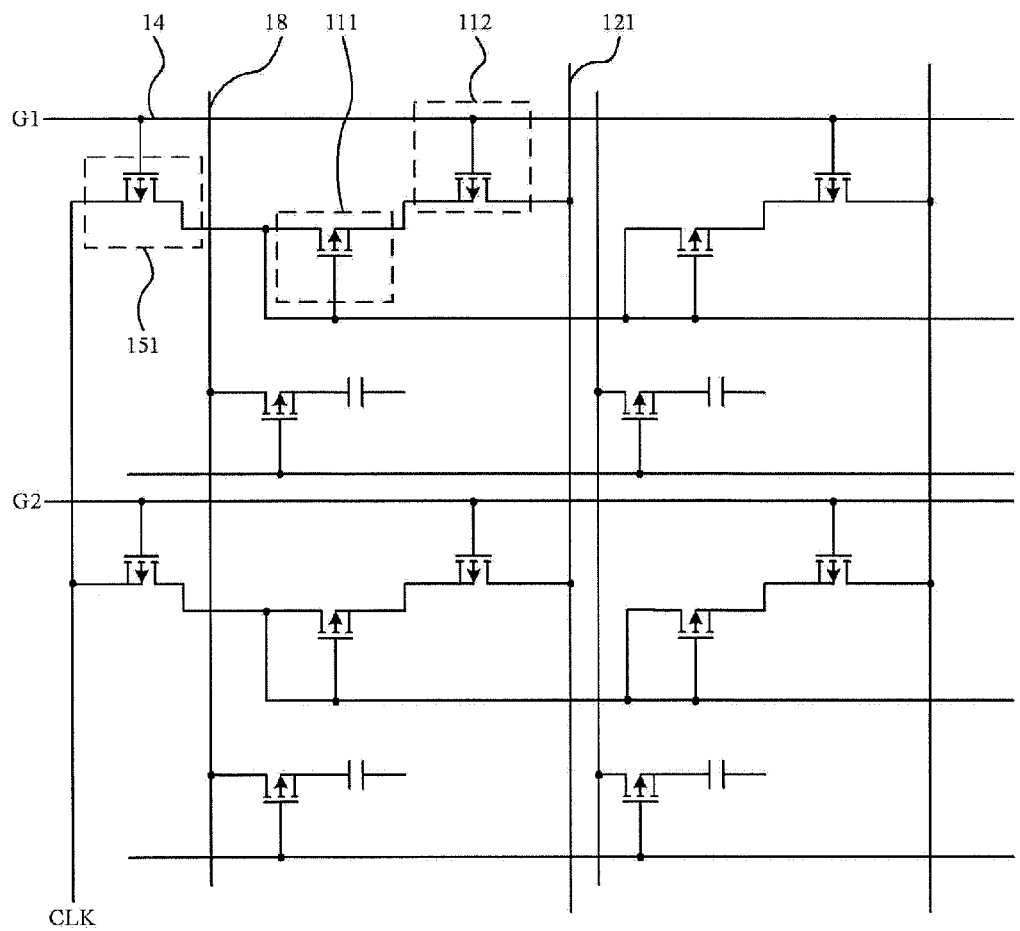
FIG. 5 is a structural schematic view of the fingerprint identification module according to an embodiment of the present invention.

As shown in FIG. 5, optionally, the fingerprint identification module may further comprise: a plurality of switching units, each switching unit when turned on receiving the modulation signal and transmitting the modulation signal to the gates and the drains of the sensing transistors 111 in the corresponding row.

Optionally, the switching unit comprises a switching transistor 151, the gate of the switching transistor 151 and the gates of the control transistors 112 in the corresponding row are connected to the same scanning line 14, the drain of the switching transistor 151 is connected with the gates and the drains of the sensing transistors 111 in the corresponding row, and the source of the switching transistor 151 receives the modulation signal.

In some embodiments, the sources of a plurality of switching transistors 151 are connected to each other.

The gate of the switching transistor 151 may be connected with the scanning line 14, i.e., with the gates of the control transistors 112 in the corresponding row. Thus, the on/off of the switching transistor 151 and the control transistors 112 in the corresponding row can be controlled synchronously by the scanning line 14.

When the scanning line 14 transmits the high voltage, the switching transistor 151 and the control transistors 112 in the corresponding row are turned on simultaneously, the modulation signal can be transmitted to the sensing units 11 in a corresponding row through the switching transistor 151 to, on the one hand, control the turn-on of the sensing transistors 111 in that row and, on the other hand, transmit the modulation signal into the sensing transistors 111 in that row. One switching transistor 151 in FIG. 5 can achieve the functions of GP1 and DP1 in FIG. 2, so as to simplify the wiring layout.

Figure 6:
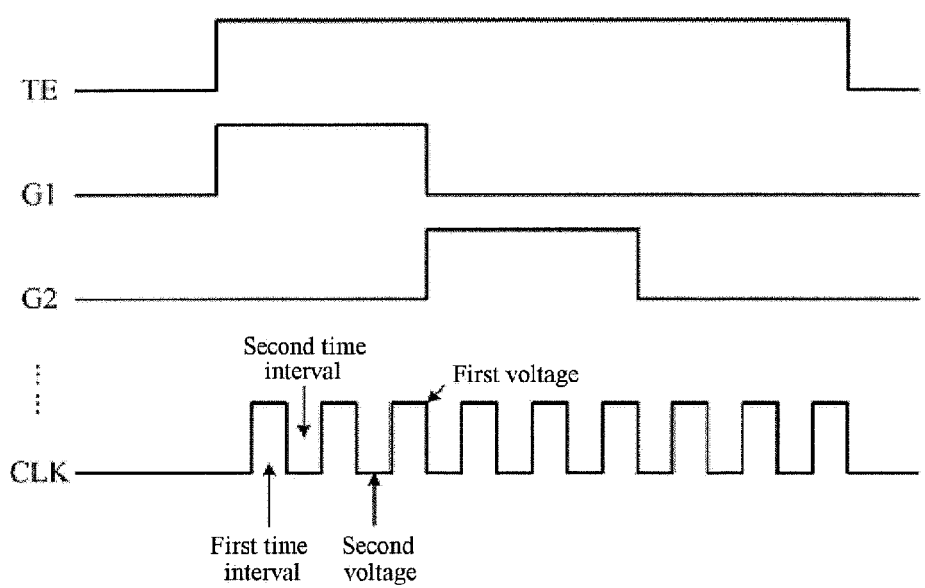
FIG. 6 is a schematic view of a modulation signal according to a further embodiment of the present invention.

In an embodiment, the sources of a plurality of switching transistors 151 are connected to each other so as to input a signal, e.g., a clock signal CLK as shown in FIG. 6, to the plurality of switching transistors 151. When the scanning line G1 transmits high voltage, the clock signal CLK can be transmitted to the sensing units 11 in the corresponding row through the switching transistor 151 in the corresponding row. When the scanning line G2 transmits high voltage, the clock signal CLK can be transmitted to the sensing units 11 in the corresponding row through the switching transistor 151 in the corresponding row. Compared with the structure as shown in FIG. 2, the signal lines, such as DP1 or DP2, corresponding to the sensing transistors 111 in each row are omitted, which further simplifies the wiring layout and improves the aperture ratio of the display panel.

In an embodiment, the switching transistor 151 can be arranged at the frame area of the display panel so as to avoid the influence on the aperture ratio.

Optionally, the voltage difference of the gates of a sensing transistor 111 is greater than the turn-on voltage of the sensing transistor 111 and less than a second preset value, such that the sensing transistor 111 is at a variable resistance area and the drain of the sensing transistor 111 receives the modulation signal.

In the present embodiment, a constant and small voltage can be provided to the gate of the sensing transistor 111 so that the sensing transistor 111 is at a variable resistance area. Where the voltage of the gate remains constant, the leakage current is positively related to the voltage of the modulation signal received by the drain, and thus the obtained third signal still contains therein leakage current of part of the turned-on sensing unit 11. However, there is only one turned-on sensing unit 11 in each row, so it is possible to eliminate the leakage currents in other sensing units 11 in the same column, so as to accurately calculate the fingerprint information on the basis of the third signal.

With regard to the connection relation between the source or the drain and other elements is concerned in the embodiments of the present application, the source can be replaced by the drain, or vice versa. Doing so achieves the same technical solution of the present application as described above. For instance, the source of the switching transistor 151 can be connected with the gates and the sources of the sensing transistors 111 in the corresponding row, and the modulation signal can be received by the drain of the switching transistor 151.

Optionally, the sensing element may be also a photoelectric diode. In such a case, a control element may be a switch element.

According to another aspect of the present invention, there is also provided a drive control circuit used for the fingerprint identification module, it generates the modulation signal and transmits the modulation signal to the sensing element 11.

According to another aspect, there is also provided a display substrate comprising the above-mentioned fingerprint identification module and/or the above-mentioned drive control circuit.

According to another aspect, there is also provided a display device comprising the above-mentioned display substrate.

What needs to be explained is that the display device in the present embodiment may be any product or part having a display function, such as electronic paper, mobile phones, tablet computers, TV, laptops, digital photo frames and navigators.

Figure 7:
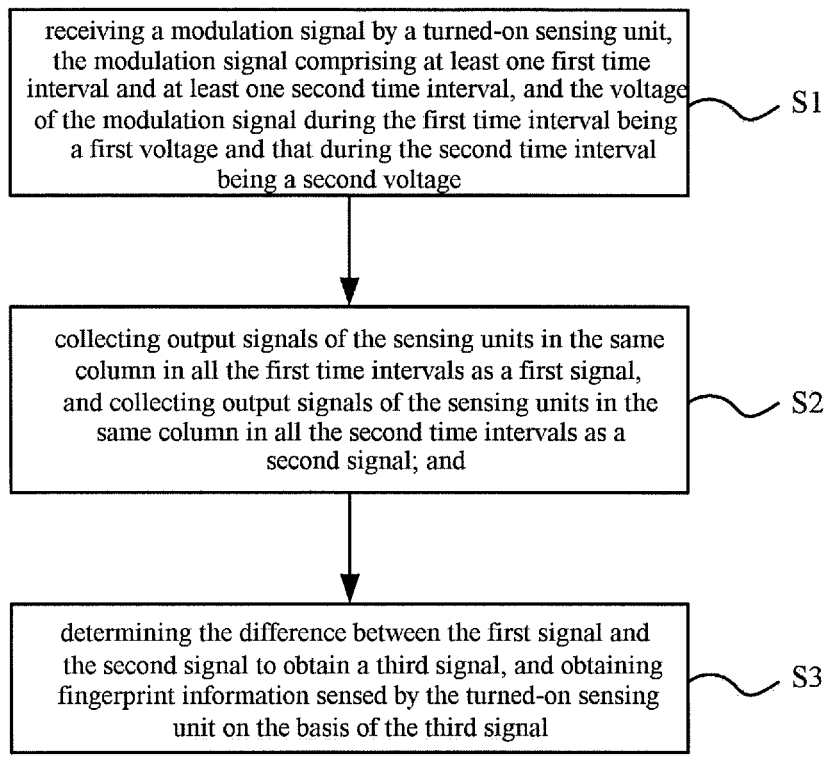
FIG. 7 is a schematic flow chart of a fingerprint identification method according to an embodiment of the present invention.

As shown in FIG. 7, according to another aspect of the present invention, there is also provided a fingerprint identification method, comprising:

Step S1: receiving a modulation signal by a turned-on sensing unit, the modulation signal comprising at least one first time interval and at least one second time interval, and the voltage of the modulation signal during the first time interval being a first voltage and that during the second time interval being a second voltage;

Step S2: collecting output signals of the sensing units in the same column in all the first time intervals as a first signal, and collecting output signals of the sensing units in the same column in all the second time intervals as a second signal; and Step S3: determining the difference between the first signal and the second signal to obtain a third signal, and obtaining fingerprint information sensed by the turned-on sensing unit on the basis of the third signal.

Optionally, the modulation signal is received by the sensing transistor in the sensing unit.

Optionally, when the voltage difference between the drain and the source of the sensing transistor is greater than a first preset value and the sensing transistor is at a saturation area, the gate of the sensing transistor receives the modulation signal.

Optionally, the switching unit receives the modulation signal and transmits the modulation signal to the gates and the drains of the sensing transistors in the corresponding row.

Optionally, when the voltage difference of the gate of the sensing transistor is greater than the turn-on voltage of the sensing transistor and less than a second preset value and the sensing transistor is at a variable resistance area, the drain of the sensing transistor receives the modulation signal.

The technical solutions of some embodiments of the present invention have been explained in detail with reference to the drawings in consideration that, in the existing fingerprint identification technology, there is leakage current in the sensing transistor, which may influence the precision of the identification result. The technical solutions of some embodiments of the present invention can eliminate the influence of the leakage current in the sensing unit during the fingerprint scanning phase, so as to make the current signals on which the calculation of fingerprint information is based correspond to the sensed difference between ridges and valleys of the fingerprint, without any leakage current, thereby obtaining more accurate fingerprint information and improving the precision of fingerprint identification.

The terms "first", "second" and "third" used herein are only for depiction and identification, and shall not be understood as an indication or implication of order or relative importance. The term "a plurality of" refers to two or more, unless otherwise expressly defined.

It may be appreciated that the above is only exemplary embodiments of the present invention, but not intended to limit the present invention, and the protection scope of the present invention shall not be limited thereto. As far as those skilled in the art are concerned, various variations and modifications can be made without departing the spirits of the invention. Any amendment, equivalent replacement or improvement, etc. made without departing from the spirit and principle of the present invention shall be deemed as falling within the protection scope of the present invention.

The protection scope of the present invention should depend on the protection scope of the appended claims.

What needs to be explained is that the above embodiments are only illustrated by way of example according to the individual function modules division. In actual application, the above functions can be allocated to different functional modules as desired. The internal structure of the device can be divided into different functional modules so as to accomplish all or part of the functions as stated above. In addition, the function of one module can be achieved by a plurality of modules, and the functions of the plurality of modules can be integrated into one module.

The term "and/or" used herein is only used to describe the connecting relations between objects connected thereby, which may be of three types. For instance, "A and/or B" can represent the following three situations: either A alone, or B alone, or both A and B. In addition, the character "/" used herein generally indicates that the former and the latter objects connected thereby is in a "or" relationship.

In the claims, any reference sign in parentheses should not be interpreted as a limitation to the claims. The term "comprise/include" does not exclude the presence of elements or steps other than those listed in the claims. The word "a" or "an" in front of elements do not exclude the presence of a plurality of such elements.

In device or system claims that enumerate several means, one or more of the means can be embodied by one and the same item of hardware. The mere fact that some measures are recited in dependent claims that are different from each other does not indicate that the combination of the measures cannot be used to advantage.

What is claimed is:

1. A fingerprint identification module, comprising:
   a plurality of fingerprint sensors, wherein each fingerprint sensor receives a modulation signal when it is turned on, the modulation signal comprises at least one first time interval and at least one second time interval, the voltage of the modulation signal during the first time interval is a first voltage and that during the second time interval is a second voltage;
   a fingerprint signal collector for collecting output signals of the fingerprint sensors in the same column in all the first time intervals as a first signal, and collecting output signals of the fingerprint sensors in the same column in all the second time intervals as a second signal; and
   a calculator for determining the difference between the first signal and the second signal as a third signal and obtaining the fingerprint information sensed by the turned-on fingerprint sensor on the basis of the third signal.

2. The fingerprint identification module according to claim 1, wherein the fingerprint sensor comprises a sensing element and a control element and the control element is connected to the sensing element and the fingerprint signal collector for control the turn-on of the sensing element.

3. The fingerprint identification module according to claim 2, wherein the sensing element comprises a sensing transistor, the control element comprises a control transistor, and the sensing transistor is connected to the control transistor, and
   wherein when a scanning line connected to the control transistor transmits high voltage, the control transistor is turned on and the sensing transistor receives the modulation signal.

4. The fingerprint identification module according to claim 3, wherein gates of the control transistors in the same row are connected to one scanning line.

5. The fingerprint identification module according to claim 3, wherein the fingerprint signal collector comprises a collecting line connected to drains of the control transistors in the same column.

6. The fingerprint identification module according to claim 3, wherein the voltage difference between the drain and the source of the sensing transistor is greater than a first preset value, such that the sensing transistor is at a saturation area, and the gate of the sensing transistor receives the modulation signal.

7. The fingerprint identification module according to claim 6, wherein the first voltage is greater than the turn-on voltage of the sensing transistor, and the second voltage is less than the turn-on voltage of the sensing transistor.

8. The fingerprint identification module according to claim 6, wherein the first voltage is greater than the second voltage, and the second voltage is greater than the turn-on voltage of the sensing transistor.

9. The fingerprint identification module according to claim 6, further comprising:
   a plurality of switching units, each switching unit when turned on receiving the modulation signal and transmitting the modulation signal to the gates and the drains of the sensing transistors in the corresponding row.

10. The fingerprint identification module according to claim 9, wherein the switching unit comprises a switching transistor, the gate of the switching transistor and the gates of the control transistors in the corresponding row are connected to the same scanning line, the drain of the switching transistor is connected with the gates and the drains of the sensing transistor in the corresponding row, and the source of the switching transistor receives the modulation signal, and
   wherein the sources of a plurality of switching transistors are connected to each other.

11. The fingerprint identification module according to claim 3, wherein the voltage difference of the gates of the sensing transistor is greater than the turn-on voltage of the sensing transistor and less than a second preset value, such that the sensing transistor is at a variable resistance area and the drain of the sensing transistor receives the modulation signal.

12. The fingerprint identification module according to claim 2, wherein the sensing element comprises a photoelectric diode.

13. A drive control circuit used for the fingerprint identification module according to claim 1, which is used to generate the modulation signal and transmit the modulation signal to the fingerprint sensors.

14. A display substrate, comprising a fingerprint identification module and a drive control circuit,
   the fingerprint identification module, comprising:
   a plurality of fingerprint sensors, wherein each fingerprint sensor receives a modulation signal when it is turned on the modulation signal comprises at least one first time interval and at least one second time interval, the voltage of the modulation signal during the first time interval is a first voltage and that during the second time interval is a second voltage;
   a fingerprint signal collector for collecting output signals of the fingerprint sensors in the same column in all the first time intervals as a first signal, and collecting output signals of the fingerprint sensors in the same column in all the second time intervals as a second signal; and
   a calculator for determining the difference between the first signal and the second signal as a third signal and obtaining the fingerprint information sensed by the turned-on fingerprint sensor on the basis of the third signal, wherein the drive control circuit is configured to generate the modulation signal and transmit the modulation signal to the fingerprint sensors.

15. A display device, comprising the display substrate according to claim 14.

16. A fingerprint identification method, comprising the steps of:

receiving a modulation signal by a turned-on fingerprint sensor, wherein the modulation signal comprises at least one first time interval and at least one second time interval, the voltage of the modulation signal during the first time interval is a first voltage and that during the second time interval is a second voltage;

collecting output signals of the fingerprint sensors in the same column in all the first time intervals as a first signal, and collecting output signals of the fingerprint sensors in the same column in all the second time intervals as a second signal; and determining the difference between the first signal and the second signal to obtain a third signal, and obtaining fingerprint information sensed by the turned-on fingerprint sensor on the basis of the third signal.

17. The fingerprint identification method according to claim 16, wherein the modulation signal is received by the sensing transistor in the fingerprint sensor.

18. The fingerprint identification method according to claim 17, wherein when the voltage difference between the drain and the source of the sensing transistor is greater than a first preset value and the sensing transistor is at a saturation area, the gate of the sensing transistor receives the modulation signal.

19. The fingerprint identification method according to claim 17, wherein the switching unit receives the modulation signal and transmits the modulation signal to the gates and the drains of the sensing transistors in the corresponding row.

20. The fingerprint identification method according to claim 17, wherein when the voltage difference of the gates of the sensing transistor is greater than the turn-on voltage of the sensing transistor and less than a second preset value and the sensing transistor is at a variable resistance area, the drain of the sensing transistor receives the modulation signal.

* * * * *